No. 811,893. PATENTED FEB. 6, 1906.
I. M. ADAMS.
SAFETY DEVICE FOR MINE CAGES.
APPLICATION FILED SEPT. 25, 1905.
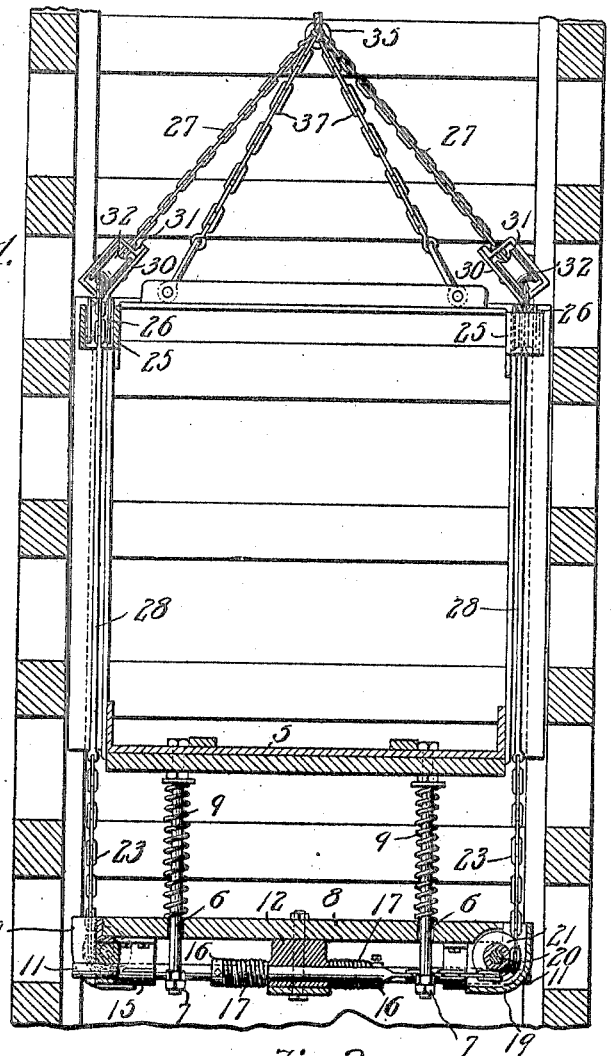
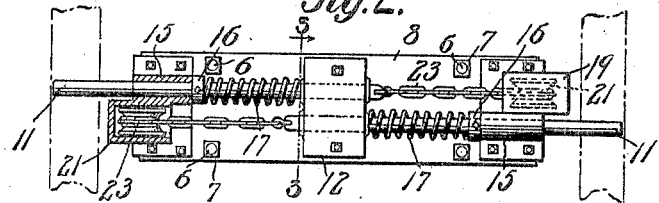
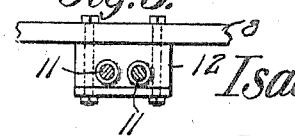
Witnesses
Isaac M. Adams,
Inventor
by
Attorneys

UNITED STATES PATENT OFFICE.

ISAAC M. ADAMS, OF SHENANDOAH, PENNSYLVANIA, ASSIGNOR OF ONE-HALF TO WILLIAM STEIN, OF SHENANDOAH, PENNSYLVANIA.

SAFETY DEVICE FOR MINE-CAGES.

No. 811,893.     Specification of Letters Patent.     Patented Feb. 6, 1906.

Application filed September 25, 1905. Serial No. 280,007.

*To all whom it may concern:*

Be it known that I, ISAAC M. ADAMS, a citizen of the United States, residing at Shenandoah, in the county of Schuylkill and State of Pennsylvania, have invented a new and useful Safety Device for Mine-Cages, of which the following is a specification.

This invention relates to safety devices for mine-cages, and has for its principal object to provide a mechanism of simple and efficient construction for arresting the downward movement of the mine-cage in case of breakage of the hoisting-cable.

A further object of the invention is to provide a safety device of such nature as to arrest the movement of the cage gradually and without any shock or jar, such as will tend to injure the passengers or damage the cage.

With these and other objects in view, as will more fully hereinafter appear, the invention consists in certain novel features of construction and arrangement of parts hereinafter fully described, illustrated in the accompanying drawings, and particularly pointed out in the appended claims.

In the drawings, Figure 1 is a front elevation, partly in section, of a mine-cage provided with a safety device constructed in accordance with the invention. Fig. 2 is an inverted plan view of a portion of the bottom of the cage, showing a pair of locking-bolts. Fig. 3 is a detail sectional view of a portion of the device on the line 3 3 of Fig. 2.

Similar numerals of reference are employed to indicate corresponding parts throughout the several figures of the drawings.

The apparatus forming the subject of the present invention is intended more especially for use in connection with mine-cages.

In all mine-shafts the timbering or lining is formed of vertical struts or props and horizontal sills or bars, the latter being arranged at intervals varying from eighteen inches to thirty-six inches in accordance with the character of the ground. Advantage is taken of these sills or bars by providing means on the cage for automatically engaging said sills or bars and arresting downward movement of the cage. Provision is also made for bringing the cage to a gradual stop, so that injury to the passengers and damage to the cage from sudden shock or jar is avoided.

On the bottom of the cage, near the front and rear sides thereof, is arranged a transversely-disposed plate 5, that is securely bolted to the bottom of the cage or may form a part thereof. Through this plate extends a number of bolts 6, four of such bolts being employed in the present instance, and at the lower ends of these bolts are lock-nuts 7, that may be rigidly held in place by upsetting the ends of the bolts, said nuts serving to limit the downward movement of the plates 8, that are provided with openings for the passage of the bolts and are held depressed by helical tension-springs 9, surrounding said bolts, the springs being of sufficient strength to act as cushions for gradually arresting or checking downward movement of the cage.

On the bottom of the plate 8 are arranged transversely-disposed locking-bolts 11, that extend for rather more than half the width of the cage. Each pair of bolts passes through a strong guide-block 12, that is bolted to the under side of the central portion of the plate and is bored for the passage of the bolts. The outer end of each bolt passes through a guiding-opening formed in a block 15, arranged near the side of the car, and on each bolt is an adjustable collar 16, between which and the central block 12 is arranged a helical compression-spring 17, tending to thrust the bolt outward beyond the side of the cage.

The guide-block 15 is preferably formed integral with a bracket and a guide member 19, that is provided with bearings for the reception of a short shaft 20, carrying a sheave 21, and through this guide and over the sheave passes a chain 23, one end of which is connected to the bolt.

From each side of the vertical arm members of the cage project arms 25, carrying sheaves 26, the arms projecting around the outer faces of the sheaves and forming guides for chains 27, that pass over said sheaves. The lower ends of these chains are connected to the lower bolt-chains by a vertically-disposed rod 28, which, being arranged at the open side of the cage, will not interfere with the movement of the coal or ore carrying cars to and from the cage-carrying platform. The upper frame members are further provided with brackets 30, which, in connection with strips 31, form supports for sheaves 32, said sheaves forming additional guides for the chain 27. All four of the chains pass upward on converging lines and are connected to a hoisting-ring 35, to which the lower end of the hoisting-cable is attached, and from this ring extend the hoisting cables or chains 37, that are connected to the cage in the usual manner and are intended to form the sole supports therefor. The chains 27 and their connecting-bars are, however, of sufficient strength to support the cage in case one of the main chains or cables 37 should break.

The safety-chains are placed under such stress as to maintain the locking-bolts retracted and the springs 17 compressed to the fullest extent, and the stress is also sufficient to slightly raise the plate 8 against the stress of the springs 9, the compression of the latter springs preventing any possibility of the bolts moving outward to locking position in case one or other of the bolt-retracting chains should stretch or lengthen through expansion or in case the chains are not placed under equal stress. The springs 9 serve, therefore, as a compensating means for insuring retention of the locking-bolts within the lines of the cage in case of defective adjustments, variation in strength of the spring 17, or the expansion of one or other of the bolt-retracting chains.

Should the main hoisting-cable part, the springs 9 will instantly throw the plate 8 to the full limit of downward movement, and the springs 17 will thrust the bolts outward into engagement with the horizontal sills of the shaft-timbering, and as the downward movement of the cage continues the springs 9 will be gradually compressed and will serve as cushions to gradually retard or check the downward movement of the cage, the latter coming to a stop without sufficient shock or jar to injure the passengers or damage the cage.

Having thus described the invention, what is claimed is—

1. In a safety device for mine-cages, a supporting-bar arranged below the floor of the cage, springs tending to depress said bar, spring-projected locking-bolts carried by the bar and arranged when projected to engage the horizontal sills of the shaft-timbering, and bolt-retracting connections between the bolts and the hoisting-cable, said members being placed under sufficient stress to retract the bolts and slightly elevate the carrying-bar, the cushioning-springs of the latter serving as compensating means for the bolts.

2. In a safety device for mine-cages, a plurality of bolts depending from the floor of the cage, a bar or plate slidably mounted on said bolts, stops arranged at the lower ends of the bolts for limiting downward movement of the plate, springs surrounding the bolts and tending to maintain the plate in its lowest position, spring-projected bolts supported by said plate, and flexible connections extending between said bolts and the hoisting-cable, said connections being placed under sufficient stress to retain the bolts retracted and the cushioning-springs slightly compressed.

In testimony that I claim the foregoing as my own I have hereto affixed my signature in the presence of two witnesses.

ISAAC M. ADAMS.

Witnesses:
   JNO. E. PARKER,
   FRANK S. APPLEMAN.